(12) United States Patent
Zeng (10) Patent No.: US 10,511,699 B2
(45) Date of Patent: Dec. 17, 2019

(54) SCREEN ASSEMBLY AND MOBILE TERMINAL

(71) Applicant: GUANGDONG OPPO MOBILE TELECOMMUNICATIONS CORP., LTD., Dongguan, Guangdong (CN)

(72) Inventor: Zanjian Zeng, Guangdong (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 16/080,274

(22) PCT Filed: May 4, 2017

(86) PCT No.: PCT/CN2017/083115
§ 371 (c)(1),
(2) Date: Aug. 27, 2018

(87) PCT Pub. No.: WO2017/190673
PCT Pub. Date: Nov. 9, 2017

(65) Prior Publication Data
US 2019/0052738 A1    Feb. 14, 2019

(30) Foreign Application Priority Data

May 4, 2016   (CN) .......................... 2016 1 0288579
May 4, 2016   (CN) ..................... 2016 2 0393789 U (51) Int. Cl.
*H04M 1/02*    (2006.01)
*G06F 1/16*    (2006.01)
*H04M 1/18*    (2006.01)

(52) U.S. Cl.
CPC ............ *H04M 1/0266* (2013.01); *G06F 1/16* (2013.01); *H04M 1/02* (2013.01); *H04M 1/18* (2013.01)

(58) Field of Classification Search
CPC .. H04B 1/3888; H04M 1/185; H04M 1/0266; H04M 1/0214
(Continued)

(56) References Cited

U.S. PATENT DOCUMENTS 7,059,182 B1    6/2006   Ragner
2011/0279961 A1  11/2011  Shedletsky et al.
(Continued)

FOREIGN PATENT DOCUMENTS

CN    1818840 A       8/2006
CN    203338336       12/2013
(Continued)

OTHER PUBLICATIONS

PCT/CN2017/083115 International Search Report and Written Opinion dated Jun. 29, 2017, 7 pages.
(Continued)

*Primary Examiner* — Sam Bhattacharya
(74) *Attorney, Agent, or Firm* — Lathrop Gage LLP (57) ABSTRACT

A screen assembly and a mobile terminal are provided. The screen assembly includes a frame and a screen. The screen is arranged on the inner side of the frame. The screen is able to move relative to the frame between a first position and a second position along a thickness direction of the screen. The screen is configured to move towards the interior of the frame from the first position to the second position in a drop process of the screen assembly.

12 Claims, 8 Drawing Sheets

(58) Field of Classification Search
USPC .............................. 455/566, 575.8; 348/296
See application file for complete search history.

(56) References Cited

U.S. PATENT DOCUMENTS

2014/0240108 A1* 8/2014 Matthews ................ G08B 6/00
340/407.1
2016/0368310 A1* 12/2016 Boychuk .................. B44C 5/04

FOREIGN PATENT DOCUMENTS

| CN | 103809666 A | 5/2014 |
| CN | 104539800 A | 4/2015 |
| CN | 104735200 A | 6/2015 |
| CN | 204442454 U | 7/2015 |
| CN | 104932745 A | 9/2015 |
| CN | 105975003 A | 9/2016 |
| CN | 205657725 U | 10/2016 |
| EP | 1691263 A1 | 8/2006 |
| EP | 2508963 A1 | 10/2012 |

OTHER PUBLICATIONS

PCT/CN2017/083115 English translation of International Search Report dated Jun. 29, 2017, 3 pages.
European Patent Application No. 17792499.0 extended Search and Opinion dated May 2, 2019, 8 pages.
Chinese Patent Application No. 201610288579.5, Office Action dated Sep. 27, 2019, 7 pages.
Chinese Patent Application No. 201610288579.5, English translation of Office Action dated Sep. 27, 2019, 10 pages.

* cited by examiner

SCREEN ASSEMBLY AND MOBILE TERMINAL

CROSS-REFERENCE TO RELATED APPLICATION

The present application is a national phase entry under 35 USC § 371 of International Application PCT/CN2017/083115, filed May 4, 2017, which claims the benefit of and priority to Chinese Patent Application No. 201620393789.6 filed May 4, 2016 and No. 201610288579.5 filed May 4, 2016, the entire disclosures of which are incorporated herein by reference.

FIELD

The present disclosure relates to a technical field of electronic communication, and particularly to a screen assembly and a mobile terminal.

BACKGROUND

In the related art, along with development of a mobile terminal, the mobile terminal has entered a large-screen stage. However, the mobile terminal gets a higher and higher proportion of screen crashes.

SUMMARY

A screen assembly according to embodiments of a first aspect of the present disclosure includes a frame and a screen. The screen is disposed at an inner side of the frame, and the screen is movable between a first position and a second position along a thickness direction of the screen with respect to the frame. In a drop process of the mobile terminal, the screen is configured to move towards an interior of the frame from the first position to the second position.

A mobile terminal according to embodiments of a second aspect of the present disclosure includes a frame; and a screen including an edge and a bottom surface where a bottom of the edge is located. The screen is disposed at an inner side of the frame, and the screen is movable between a first position, where the bottom surface of the screen is flush with or lower than an upper surface of the frame, and a second position, where the bottom surface of the screen is completely accommodated in the frame, along a thickness direction of the screen with respect to the frame.

A mobile terminal according to embodiments of a third aspect of the present disclosure includes a rim and the screen. The screen is disposed at the inner side of the rim, and the screen is movable between the first position and the second position along the thickness direction of the screen with respect to the rim. In the drop process of the mobile terminal, the screen is configured to move towards the interior of the rim from the first position to the second position.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Embodiments of the present disclosure will be described in detail and examples of the embodiments will be illustrated in the accompanying drawings. The same or similar elements and the elements having same or similar functions are denoted by like reference numerals throughout the descriptions. The embodiments described herein with reference to the drawings are explanatory, which aim to illustrate the present disclosure, but shall not be construed to limit the present disclosure.

In the specification, it is to be understood that terms such as "center," "length," "width," "thickness," "upper," "lower," "top," "bottom," "inner," and "outer" should be construed to refer to the orientation or position as then described or as illustrated in the drawings under discussion. These relative terms are for convenience of description, and do not indicate or imply that the device or element referred to must have a particular orientation or be constructed and operated in a particular orientation, and hence cannot be constructed to limit the present disclosure. In addition, the terms "first" and "second" are used herein for purposes of description and are not intended to indicate or imply relative importance or significance or to imply the number of indicated technical features. Thus, the feature defined with "first" and "second" may indicate or imply including one or more of this feature. In the description of the present disclosure, the term "a plurality of" means two or more than two, unless specified otherwise.

In the description of the present disclosure, it should be understood that, unless specified or limited otherwise, the terms "mounted," "connected," and "coupled" and variations thereof are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

A screen assembly according to embodiments of a first aspect of the present disclosure is described below with reference to FIG. 1 to FIG. 7. The screen assembly can be applied to a mobile terminal 100. The mobile terminal 100 can be a mobile phone, a tablet computer and the like, but is not limited to that.

As illustrated in FIG. 1 to FIG. 4, the screen assembly according to embodiments of the present disclosure includes a frame 1 and a screen 2.

Figure 1:
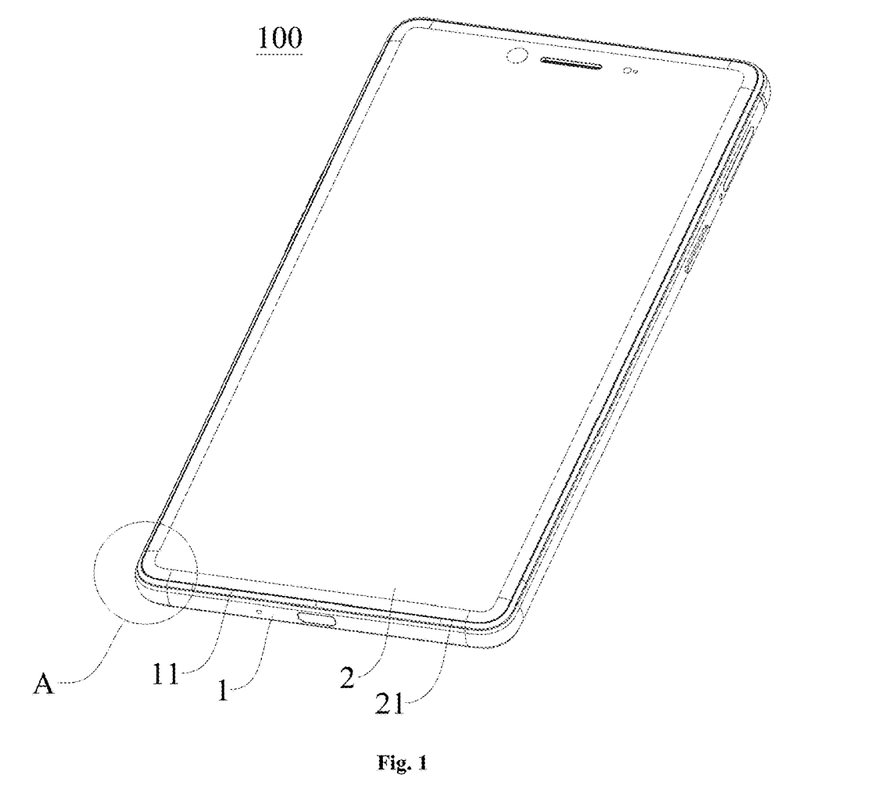
FIG. 1 is a schematic view of a mobile terminal according to an embodiment of the present disclosure, in which a screen of the mobile terminal is located in a first position.
Figure 2:
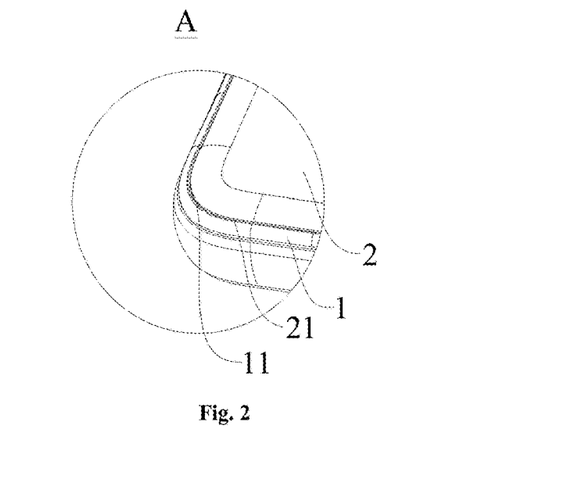
FIG. 2 is an enlarged view of portion A circled in FIG. 1.
Figure 3:
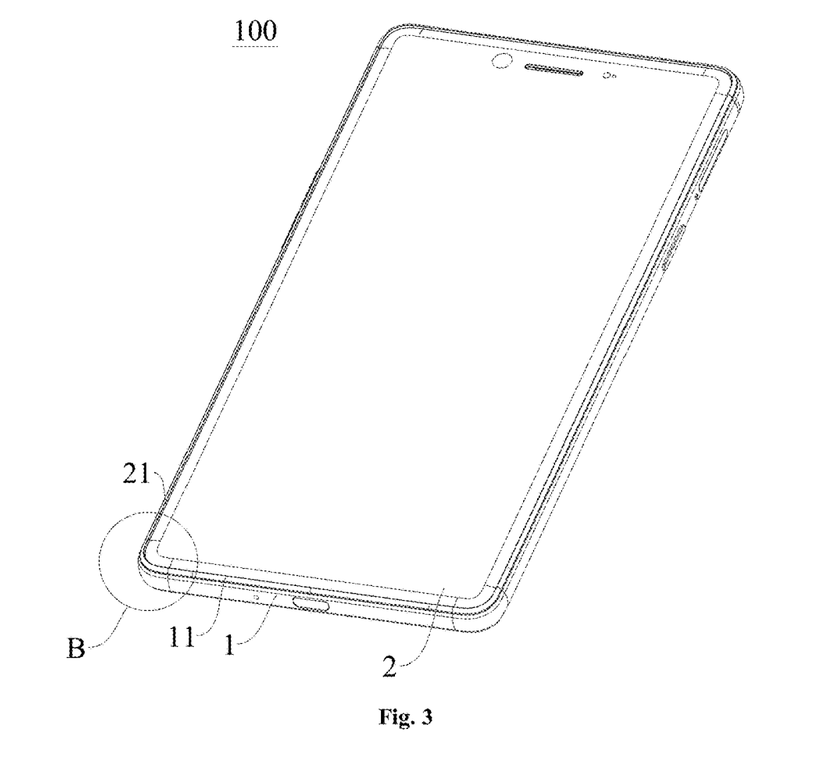
FIG. 3 is another schematic view of a mobile terminal according to an embodiment of the present disclosure, in which a screen of the mobile terminal is located in a second position.
Figure 4:
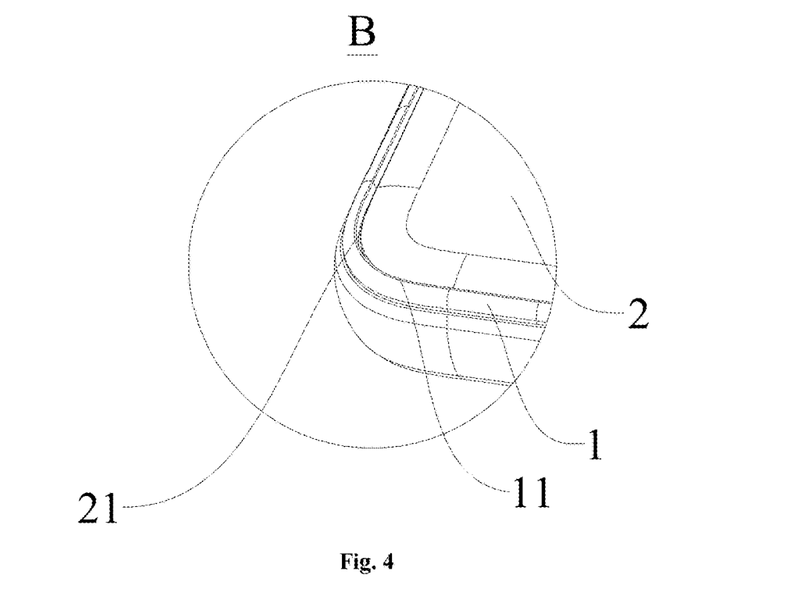
FIG. 4 is an enlarged view of portion B circled in FIG. 3.

Specifically, the screen 2 can be disposed at an inner side of the frame 1, and the screen 2 is movable between a first position and a second position along a thickness direction of the screen 2 with respect to the frame 1. In a drop process of the screen assembly, the screen 2 can move towards an interior of the frame 1 from the first position to the second position. When the screen 2 is located in the second position, a bottom surface of an edge 21 of the screen 2 is completely accommodated in the frame 1. When a user uses the screen assembly normally, the screen 2 is located in the first position (as illustrated in FIG. 1), and during the drop of the screen assembly, the screen 2 is located in the second position (as illustrated in FIG. 2).

For example, during the drop of the screen assembly, the screen 2 moves towards the interior of the frame 1, so that the frame 1 is raised relative to the bottom surface of the edge 21 of the screen 2, thereby enabling the bottom surface of the edge 21 of the screen 2 to be completely accommodated in the frame 1. Thus, during the drop of the screen assembly, it is possible to protect the edge 21 of the screen 2 effectively and cushion an impact force suffered by an upper surface of the screen 2, which reduces probability of a crash of the screen 2, improves the crash resistance and reliability of the screen 2 effectively, prolongs the service life of the screen assembly, and decreases the use cost. Herein, it is to be explained that "the bottom surface of the edge 21 of the screen 2" stated in the present application refers to a plane where a bottom of the edge 21 of the screen 2 is located.

Certainly, it can be understood that when the screen 2 is located in the first position, the bottom surface of the edge 21 of the screen 2 can also be completely accommodated in the frame 1. Thus, the screen 2 can be better protected and the reliability of the screen 2 can be improved.

In the screen assembly according to embodiments of the present disclosure, with the screen 2 being movably disposed in the frame 1, the screen 2 is enabled to be movable between the first position and the second position along the thickness direction of the screen 2 with respect to the frame 1, and the bottom surface of the edge 21 of the screen 2 is enabled to be completely accommodated in the frame 1 when the screen 2 is located in the second position. Thus, during the drop of the screen assembly, it is possible to protect the edge 21 of the screen 2 effectively and cushion the impact force suffered by the upper surface of the screen 2, which reduces the probability of the crash of the screen 2, improves the crash resistance and reliability of the screen 2 effectively, prolongs the service life of the screen assembly, and decreases the use cost of the screen assembly.

According to some embodiments of the present disclosure, when the screen 2 is located in the first position, the bottom surface of the edge 21 of the screen 2 is flush with an upper surface of the frame 1. For example, during a normal use of the user, the bottom surface of the edge 21 of the screen 2 can be flush with the upper surface of the frame 1. Thus, the appearance of the screen assembly can be improved and comfortable sensation of the user when using the screen assembly can be enhanced, so that the user experience is better. Herein, it is to be explained that "the upper surface of the frame 1" stated in the present application refers to a plane where an upper edge 11 of the frame 1 is located.

According to some other embodiments of the present disclosure, when the screen 2 is located in the first position, the bottom surface of the edge 21 of the screen 2 can be higher than or slightly lower than the upper surface of the frame 1. Thus, the appearance of the screen assembly and the comfortable sensation of the user when using the mobile terminal 100 can also be improved, so that the user experience is better.

Specifically, when the screen 2 is located in the first position and the bottom surface of the edge 21 of the screen 2 is lower than the upper surface of the frame 1, a distance between the bottom surface of the edge 21 of the screen 2 and the upper surface of the frame 1 is D1. D1 can satisfy: 0<D1≤1 mm, and a specific value of D1 can be adjustably designed according to models of the screen assembly. For example, D1 can further satisfy: 0<D1≤0.01 mm. Thus, the probability of the crash of the screen 2 can be reduced effectively and the crash resistance and reliability of the screen 2 can be further improved.

According to some embodiments of the present disclosure, when the screen 2 is located in the second position, the bottom surface of the edge 21 of the screen 2 is located below the upper surface of the frame 1, and the distance between the bottom surface of the edge 21 of the screen 2 and the upper surface of the frame 1 is L1. L1 satisfies: 0.01 mm≤L1≤1 mm, and a specific value of L1 can be adjustably designed according to models of the screen assembly. For example, L1 can further satisfy: L1=0.02 mm or the like. Thus, the screen 2 can be prevented from crashing and the overall thickness of the screen assembly can be reduced.

Figure 5:
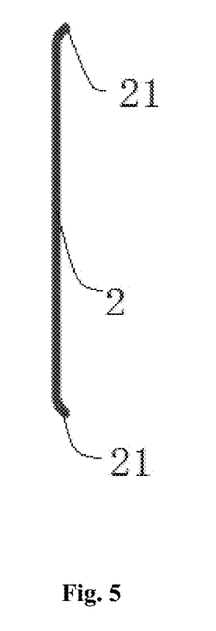
FIG. 5 is a schematic view of a two-and-a-half-dimensional screen of a mobile terminal according to an embodiment of the present disclosure.

In at least one embodiment, the screen 2 can be a two-and-a-half-dimensional screen or the like, but is not limited to this. Specifically, as illustrated in FIG. 5, the two-and-a-half-dimensional screen has a flat surface area in a center and a curved-surface transition in a periphery. That is, the edge 21 of the two-and-a-half-dimensional screen is performed with a radian processing on the basis of the flat surface. Thus, the screen 2 exhibits more visual tension, the visual effect of the screen 2 and the mobile terminal 100 such as the mobile phone is enhanced effectively, and meanwhile hand feeling of the user when using the screen assembly is improved.

Figure 6:
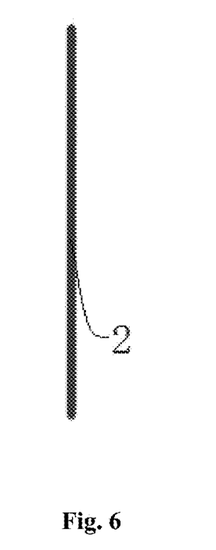
FIG. 6 is a schematic view of a two-dimensional screen of a mobile terminal according to an embodiment of the present disclosure.
Figure 7:
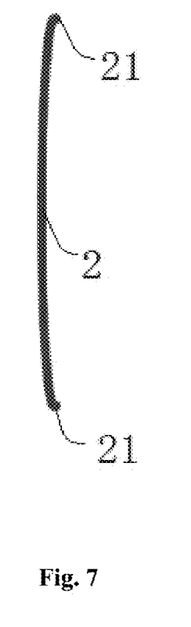
FIG. 7 is a schematic view of a three-dimensional screen of a mobile terminal according to an embodiment of the present disclosure.

Certainly, it could be understood that the screen 2 can also be a two-dimensional screen, a three-dimensional screen or the like. Specifically, as illustrated in FIG. 6 and FIG. 7, the two-dimensional screen is formed to be a flat screen, and the three-dimensional screen forms a curved surface from the edge 21 to the center of the screen 2 besides the edge 21 having certain radian.

The screen assembly according to embodiments of a second aspect of the present disclosure is described below with reference to FIG. 1. The screen assembly can be applied to the mobile terminal 100. The mobile terminal 100 can be the mobile phone, the tablet computer and the like, but is not limited to that.

As illustrated in FIG. 1, the screen assembly according to embodiments of the present disclosure includes the frame 1 and the screen 2.

Specifically, the screen 2 can be disposed at the inner side the frame 1, and the bottom surface of the edge 21 of the screen 2 is lower than the upper surface of the frame 1. Thus, during the drop of the screen assembly, the frame 1 can protect the edge 21 of the screen 2 effectively, which reduces the probability of the crash of the screen 2, improves the crash resistance and reliability of the screen 2 effectively, prolongs the service life of the screen assembly, and decreases the use cost. Herein, it is to be explained that "the bottom surface of the edge 21 of the screen 2" said in the present application refers to a plane where the bottom of the edge 21 of the screen 2 is located.

According to some embodiments of the present disclosure, the distance between the bottom surface of the edge 21 of the screen 2 and the upper surface of the frame 1 is L2. L2 can satisfy: 0.01 mm≤L2≤1 mm, and a specific value of L2 can be adjustably designed according to models of the screen assembly. For example, L2 can further satisfy: L2=0.02 mm or the like. Thus, the screen 2 can be prevented from crashing and the overall thickness of the screen assembly can be reduced.

In at least one embodiment, the screen 2 can be the two-and-a-half-dimensional screen and the like, but is not limited to this. Specifically, as illustrated in FIG. 5, the two-and-a-half-dimensional screen has the flat surface area in the center and the curved-surface transition in the periphery. That is, the edge 21 of the two-and-a-half-dimensional screen is performed with the radian processing on the basis of the flat surface. Thus, the screen 2 exhibits more visual tension, the visual effect of the screen 2 and the mobile terminal 100 such as the mobile phone is enhanced effectively, and meanwhile hand feeling of the user when using the screen assembly is improved.

Certainly, it could be understood that the screen 2 can also be the two-dimensional screen, the three-dimensional screen and the like. Specifically, as illustrated in FIG. 6 and FIG. 7, the two-dimensional screen is formed to be the flat screen, and the three-dimensional screen forms the curved surface from the edge 21 to the center of the screen 2 besides the edge 21 having certain radian.

The mobile terminal 100 according to embodiments of the third aspect of the present disclosure is described below. The mobile terminal 100 can be the mobile phone, the tablet computer and the like. In the following description of the present disclosure, the mobile phone is taken as an example of the mobile terminal 100 to be explained.

As illustrated in FIG. 1 to FIG. 4, the mobile terminal 100 according to embodiments of the present disclosure includes the frame 1 and the screen 2.

Specifically, the screen 2 of the mobile terminal 100 such as the mobile phone can be disposed at the inner side of the frame 1, and the screen 2 is movable between the first position and the second position along the thickness direction of the screen 2 with respect to the frame 1. In a drop process of the mobile terminal 100, the screen 2 can move towards the interior of the frame 1 from the first position to the second position. When the screen 2 is located in the second position, the bottom surface of the edge 21 of the screen 2 is completely accommodated in the frame 1. When the user uses the mobile terminal 100 normally, the screen 2 is located in the first position (as illustrated in FIG. 1), and during the drop of the mobile terminal 100, the screen 2 is located in the second position (as illustrated in FIG. 2).

For example, during the drop of the mobile terminal 100, the screen 2 moves towards the interior of the frame 1, so that the frame 1 of the mobile terminal 100 is raised relative to the bottom surface of the edge 21 of the screen 2, thereby enabling the bottom surface of the edge 21 of the screen 2 to be completely accommodated in the frame 1. Thus, during the drop of the mobile terminal 100, it is possible to protect the edge 21 of the screen 2 effectively and cushion the impact force suffered by the upper surface of the screen 2, which reduces the probability of the crash of the screen 2, improves the crash resistance and reliability of the screen 2 effectively, prolongs the service life of the mobile terminal 100, and decreases the use cost. Herein, it is to be explained that "the bottom surface of the edge 21 of the screen 2" stated in the present application refers to the plane where the bottom of the edge 21 of the screen 2 is located.

Certainly, it can be understood that when the screen 2 is located in the first position, the bottom surface of the edge 21 of the screen 2 can also be completely accommodated in the frame 1. Thus, the screen 2 can be better protected and the reliability of the screen 2 can be further improved.

In the mobile terminal 100 according to embodiments of the present disclosure, with the screen 2 of the mobile terminal 100 being movably disposed in the frame 1, the screen 2 is enabled to be movable between the first position and the second position along the thickness direction of the screen 2 with respect to the frame 1, and the bottom surface of the edge 21 of the screen 2 is enabled to be completely accommodated in the frame 1 when the screen 2 is located in the second position. Thus, during the drop of the mobile terminal 100, it is possible to protect the edge 21 of the screen 2 effectively and cushion the impact force suffered by the upper surface of the screen 2, which reduces the probability of the crash of the screen 2, improves the crash resistance and reliability of the screen 2 effectively, prolongs the service life of the mobile terminal 100, and decreases the use cost of the mobile terminal 100.

According to some embodiments of the present disclosure, when the screen 2 is located in the first position, the bottom surface of the edge 21 of the screen 2 is flush with the upper surface of the frame 1. For example, during the normal use of the user, the bottom surface of the edge 21 of the screen 2 can be flush with the upper surface of the frame 1. Thus, the appearance of the screen assembly can be improved and comfortable sensation of the user when using the screen assembly can be enhanced, so that the user experience is better. Herein, it is to be explained that "the upper surface of the frame 1" stated in the present application refers to the plane where the upper edge 11 of the frame 1 is located.

According to some other embodiments of the present disclosure, when the screen 2 is located in the first position, the bottom surface of the edge 21 of the screen 2 can be higher than or slightly lower than the upper surface of the frame 1. Thus, the appearance of the mobile terminal 100 and the comfortable sensation of the user when using the mobile terminal 100 can also be improved, so that the user experience is better.

Specifically, when the screen 2 is located in the first position and the bottom surface of the edge 21 of the screen 2 is lower than the upper surface of the frame 1, the distance between the bottom surface of the edge 21 of the screen 2 and the upper surface of the frame 1 is D2. D2 can satisfy: 0<D2≤1 mm, and a specific value of D2 can be adjustably designed according to models of the mobile terminal 100. For example, D2 can further satisfy: 0<D2≤0.01 mm. Thus, the probability of the crash of the screen 2 can be reduced effectively and the crash resistance and reliability of the screen 2 can be further improved.

According to some embodiments of the present disclosure, when the screen 2 is located in the second position, the bottom surface of the edge 21 of the screen 2 is located below the upper surface of the frame 1, and the distance between the bottom surface of the edge 21 of the screen 2 and the upper surface of the frame 1 is L3. L3 satisfies: 0.01 mm≤L3≤1 mm, and a specific value of L3 can be adjustably designed according to models of the mobile terminal 100. For example, L3 can further satisfy: L3=0.02 mm or the like. Thus, the screen 2 can be prevented from crashing and the overall thickness of the mobile terminal 100 can be reduced so that the appearance of the mobile terminal 100 is more aesthetic.

In at least one embodiment, the screen 2 can be the two-and-a-half-dimensional screen or the like, but is not limited to this. Specifically, as illustrated in FIG. 5, the two-and-a-half-dimensional screen has the flat surface area in the center and the curved-surface transition in the periphery. That is, the edge 21 of the two-and-a-half-dimensional screen is performed with the radian processing on the basis of the flat surface. Thus, the screen 2 exhibits more visual tension, the visual effect of the screen 2 and the mobile terminal 100 such as the mobile phone is enhanced effectively, and meanwhile hand feeling of the user when using the mobile terminal 100 is improved.

Certainly, it could be understood that the screen 2 can also be the two-dimensional screen, the three-dimensional screen or the like. Specifically, as illustrated in FIG. 6 and FIG. 7, the two-dimensional screen is formed to be the flat screen, and the three-dimensional screen forms the curved surface from the edge 21 to the center of the screen 2 besides the edge 21 having certain radian. The specific specification and model of the screen 2 can be adjustably designed according to requirements of the mobile terminal 100 and are not specifically limited in the present disclosure.

According to some embodiments of the present disclosure, the mobile terminal 100 further includes a moving mechanism 3. The moving mechanism 3 can be disposed in the frame 1, the moving mechanism 3 is configured to drive the screen 2 to move from the first position to the second position during the drop of the mobile terminal 100, so as to protect the screen 2 effectively and improve the crash resistance and reliability of the screen 2.

Specifically, the moving mechanism 3 can include a sensor 30 and a driving unit 31. The sensor 30 can be connected with a controller of the mobile terminal 100, and the driving unit 31 is connected to the controller and the screen 2 separately so as to drive the screen 2 to move from the first position to the second position during the drop of the mobile terminal 100. Specifically, the driving unit 31 can be connected to a lower position of the screen 2 and is communicable with the sensor 30. The driving unit 31 can include a stretch-retract supporting component such as a spring.

For example, during normal use, the spring can be in a stretch state, the bottom surface of the edge 21 of the screen 2 can be flush with, or slightly lower than, or higher than the upper surface of the frame 1. During the drop of the mobile terminal 100, the mobile terminal 100 is in a weightlessness condition, the sensor 30 senses a weightlessness signal and transits it to the controller, the controller drives the driving unit 31 to retract, which makes the screen 2 to move towards the interior of the frame 1 along the thickness direction of the screen 2, allowing the bottom surface of the edge 21 of the screen 2 to be completely accommodated in the frame 1, thereby protecting the edge 21 of the screen 2 effectively and cushioning the impact force suffered by the upper surface of the screen 2, which reduces the probability of the crash of the screen 2, improves the crash resistance and reliability of the screen 2 effectively, prolongs the service life of the mobile terminal 100, and decreases the use cost of the mobile terminal 100.

Further, a timer can be provided in the mobile terminal 100, and the timer starts the timing when the mobile terminal 100 drops or after the drop of the mobile terminal 100. For example, it can be set that the controller drives the driving unit 31 to recover to a state in normal use after t seconds of time.

In some embodiments, the sensor 30 may be at least one of a gyroscope, an acceleration sensor, a gravity sensor, an inertial sensor, a camera, a height sensor, a motion sensor. That is to say, the sensor 30 may be one or more of the gyroscope, the acceleration sensor, the gravity sensor, the inertial sensor, the camera, the height sensor, the motion sensor. For example, in a specific embodiment of the present disclosure, the sensor 30 is the gyroscope and the gravity sensor. Thus, a drop state of the mobile terminal 100 can be detected sensitively and accurately, the reliability of the sensor 30 can be ensured, and further the reliability of the mobile terminal 100 can be ensured.

A specific embodiment of the mobile terminal 100 according to embodiments of the present disclosure is described below.

As illustrated in FIG. 1 to FIG. 4, the mobile terminal 100 according to embodiments of the present disclosure includes the frame 1, the screen 2 and the moving mechanism 3. The screen 2 is the two-and-a-half-dimensional screen.

Specifically, the screen 2 of the mobile terminal 100 is disposed at the inner side of the frame 1, and the screen 2 is movable between the first position and the second position along the thickness direction of the screen 2 with respect to the frame 1. In the drop process of the mobile terminal 100, the screen 2 can move towards the interior of the frame 1 from the first position to the second position. When the screen 2 is located in the second position, the bottom surface of the edge 21 of the screen 2 is completely accommodated in the frame 1. When the user uses the mobile terminal 100 normally, the screen 2 is located in the first position, and the bottom surface of the edge 21 of the screen 2 is flush with the upper surface of the frame 1.

During the drop of the mobile terminal 100, the screen 2 is located in the second position. For example, during the drop of the mobile terminal 100, the screen 2 of the mobile terminal 100 moves towards the interior of the frame 1, so that the frame 1 of the mobile terminal 100 is raised relative to the bottom surface of the edge 21 of the screen 2, thereby enabling the bottom surface of the edge 21 of the screen 2 to be completely accommodated in the frame 1. Thus, during the drop of the mobile terminal 100, it is possible to protect the edge 21 of the screen 2 effectively and cushion the impact force suffered by the upper surface of the screen 2, which reduces the probability of the crash of the screen 2, improves the crash resistance and reliability of the screen 2 effectively, prolongs the service life of the mobile terminal 100, and decreases the use cost.

When the screen 2 is located in the second position, the bottom surface of the edge 21 of the screen 2 is located below the upper surface of the frame 1, and the distance between the bottom surface of the edge 21 of the screen 2 and the upper surface of the frame 1 is L3. L3 satisfies: $0.01 \text{ mm} \leq L3 \leq 1 \text{ mm}$. Thus, the screen 2 can be prevented from crashing and the overall thickness of the mobile terminal 100 can be reduced so that the appearance of the mobile terminal 100 is more aesthetic.

The moving mechanism 3 can be disposed in the frame 1, the moving mechanism 3 is configured to drive the screen 2 to move from the first position to the second position during the drop of the mobile terminal 100, so as to protect the screen 2 effectively and improve the crash resistance and reliability of the screen 2.

Specifically, the moving mechanism 3 can include the sensor 30 and the driving unit 31. The sensor 30 can be connected with the controller of the mobile terminal 100, and the driving unit 31 is connected to the controller and the screen 2 separately so as to drive the screen 2 to move from the first position to the second position during the drop of the mobile terminal 100. Specifically, the driving unit 31 can be connected to the lower position of the screen 2 and is communicable with the sensor 30.

Figure 8:
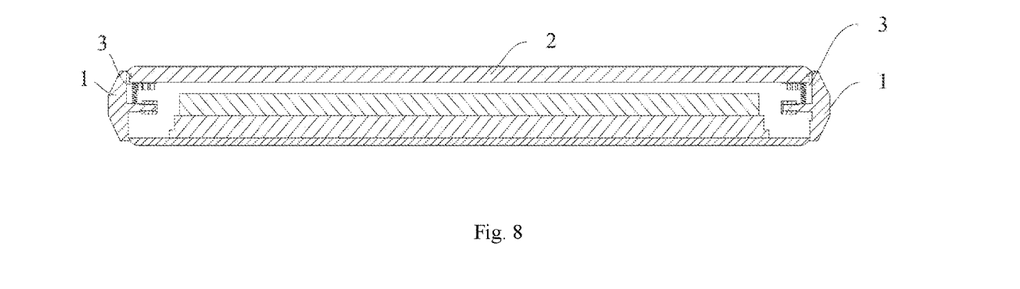
FIG. 8 is a sectional view of a moving mechanism of a mobile terminal according to an embodiment of the present disclosure.

The driving unit 31 according to a specific embodiment of the present disclosure will be described with reference to FIGS. 8 to 10.

According some embodiments of the present disclosure, the driving unit 31 includes a first magnet 310 and a second magnet 312. The first magnet 310 is fixedly provided to a lower side of the screen 2, and the second magnet 312 is fixedly provided to the frame 1. The second magnet 312 is configured to cooperate with the first magnet 310 to drive the screen 2 to move from the first position to the interior of the frame 1, allowing the bottom surface of the edge 21 of the screen 2 to be completely accommodated in the frame 1.

Specifically, the second magnet 312 may be arranged opposite the first magnet 310. Therefore, when the mobile terminal drops, the second magnet 312 and the first magnet 310 cooperate to drive the screen 2 to move towards the interior of the frame 1, such that the bottom surface of the edge 21 of the screen 2 is completely accommodated in the frame 1.

In the present embodiment, during the dropping process of the mobile terminal 100, an attraction force may be generated between the first magnet 310 and the second magnet 312 to allow the first magnet 310 to move towards the second magnet 312, such that the screen 2 can be driven to move to the interior of the frame 1, and the bottom surface of the edge 21 of the screen 2 is completely accommodated in the frame 1. The edge 21 of the screen 2 is prevented from being damaged by means of the protection of the frame 1 for the edge 21 of the screen when the mobile terminal 100 drops.

Figure 9:
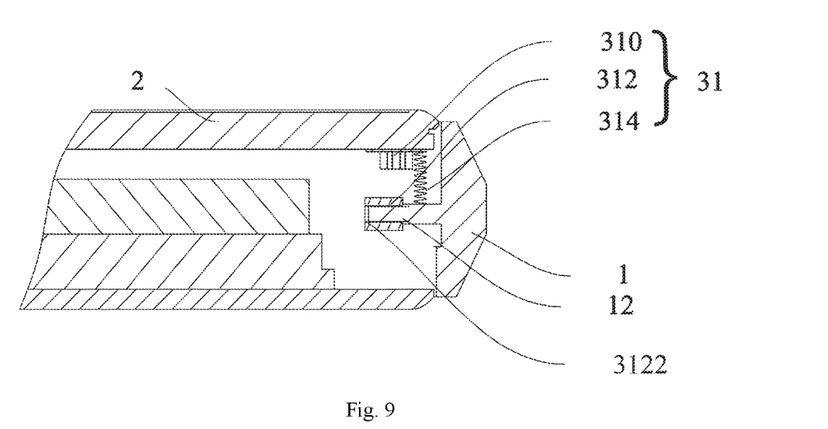
FIG. 9 is a partial detail view of the moving mechanism shown in FIG. 8, in which a screen is in a first position.
Figure 10:
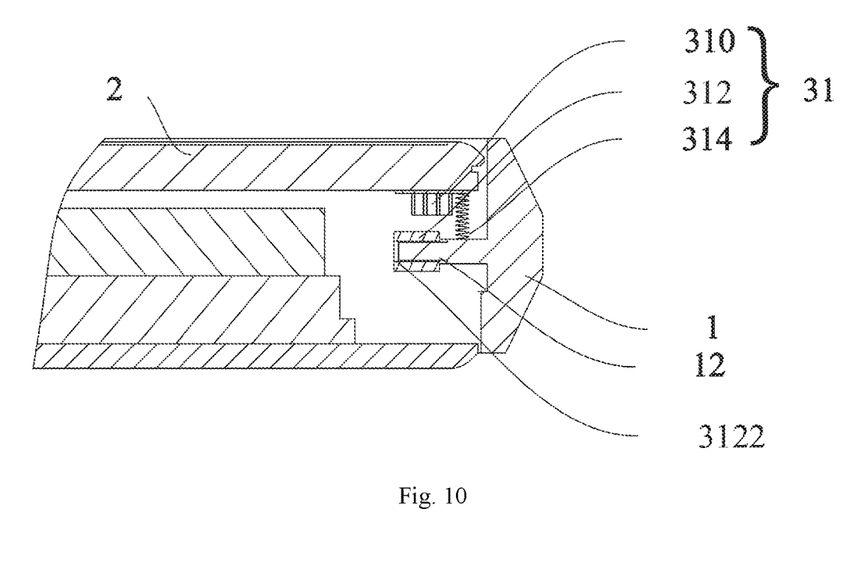
FIG. 10 is a partial detail view of the moving mechanism shown in FIG. 8, in which a screen is in a second position.

For example, as illustrated in FIG. 9, the second magnet 312 defines a mounting hole 3122, the frame 1 is provided with a mounting post 12, and the mounting post 12 is fitted with the mounting hole 3122 to secure the second magnet 312 to the frame. The structure is simple and easy to assemble. In some embodiment, the mounting post 12 is integrally formed with the frame 1. Thus, the machining process of the frame 1 may be simplified, the machining cost may be reduced and the entire structural strength of the mounting post 12 may be enhanced.

In some embodiments, the first magnet 310 is a permanent magnet, and the second magnet 312 is an electromagnet. Thus, when the mobile terminal 100 drops, a current can be applied to a coil of the electromagnet to generate the attraction force between the first magnet 310 and the second magnet 312, such that the movement of the screen 2 can be achieved through cooperation of the first magnet 310 and the second magnet 312, thereby protecting the mobile terminal 100.

In some embodiments, the sensor 30 is configured to sense the drop state of the mobile terminal 100, and the controller 4 of the mobile terminal 100 is separately coupled to the second magnet 312 and the sensor 30. In some embodiments of the present disclosure, the controller 4 is configured to apply a current to the second 312 when the sensor 30 senses that the mobile terminal 100 drops, such that the attraction force is generated between the first magnet 310 and the second magnet 312, and the screen 2 is driven to move from the first position to the second position, as illustrated in FIG. 10; and configured to apply a current in an opposite direction to second magnet 312 when the sensor 30 senses that the mobile terminal 100 is stationary, such that a repulsive force is generated between the first magnet 310 and the second magnet 312, and the screen 2 is driven to restore from the second position to the first position. It should be noted that, "the mobile terminal 100 being stationary" means that the mobile terminal 100 is not in the drop state.

According to some embodiments of the present disclosure, the driving unit 31 further includes a spring 314. The spring 314 is provided between the screen 2 and the frame 1. For example, during normal use, the spring can be in a stretch state, the bottom surface of the edge 21 of the screen 2 can be flush with, or slightly lower than, or higher than the upper surface of the frame 1. Thus, the controller 4 is configured to energize the second magnet 312 when the sensor 30 senses that the mobile terminal 100 drops, such that the attraction force is generated between the first magnet 310 and the second magnet 312, and the screen 2 is driven to move from the first position to the second position, and the spring 314 is compressed, as illustrated in FIG. 10; and configured to deenergize the second magnet 312 when the sensor 30 senses that the mobile terminal 100 is stationary, such that the screen 2 restores from the second position to the first position under an elastic restoring force of the spring 314.

Further, the timer can be provided in the mobile terminal 100, and the timer starts the timing when the mobile terminal 100 drops or after the drop of the mobile terminal 100. For example, it can be set that the controller drives the driving unit 31 to recover to the state in normal use after t seconds of time.

It could be understood that, in other embodiments of the present disclosure, both of the first magnet 310 and the second magnet 312 may be the permanent magnets. In still other embodiments of the present disclosure, the first magnet 310 is the electromagnet, and the second magnet 312 is the permanent magnet. Similarly, the movement of the screen 2 can be achieved by the cooperation of the first magnet 310 and the second magnet 312, thereby protecting the mobile terminal 100.

Figure 11:
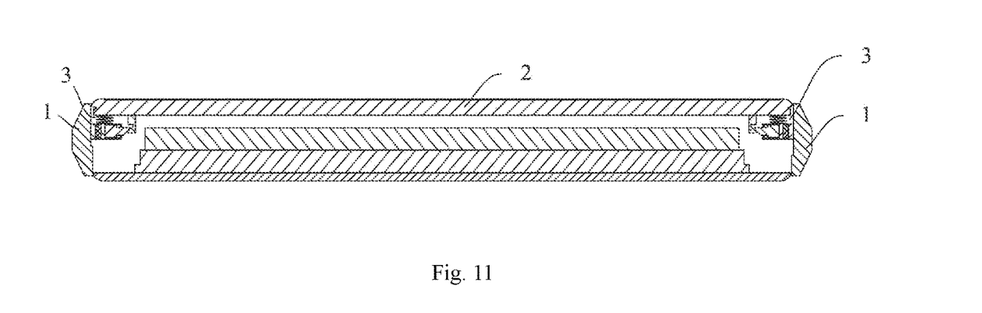
FIG. 11 is a sectional view of a moving mechanism of a mobile terminal according to another embodiment of the present disclosure.

A driving unit 31' according to a specific embodiment of the present disclosure will be described with reference to FIGS. 11 to 13.

Figure 12:
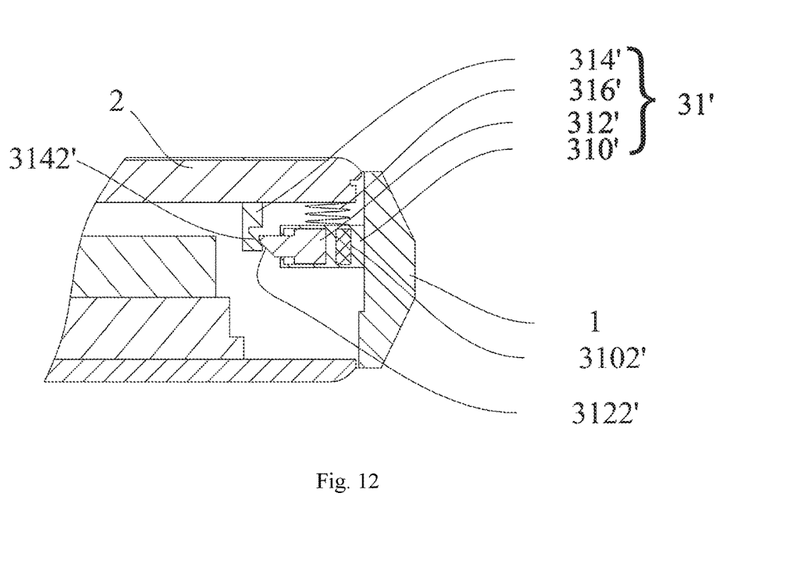
FIG. 12 is a partial detail view of the moving mechanism shown in FIG. 11, in which a screen is in a first position.

As illustrated in FIG. 12, the driving unit 31' includes an accommodating part 310', a first fitting part 312' and a second fitting part 314'. The accommodating part 310' is fixedly coupled to the frame 1, the first fitting part 312' is movably provided in the accommodating part 310', and the second fitting part 314' is fixedly coupled to the lower side of the screen 2. The first fitting part 312' may be fitted with the second fitting part 314' to push the second fitting part 314' to move from the first position to the second position, allowing the bottom surface of the edge 21 of the screen 2 to be completely accommodated in the frame 1.

It should be noted that, when the mobile terminal 100 drops, the first fitting part 312' drives the second fitting part 314' to switch from the first position to the second position, the second fitting part 314' drives the screen 2 to move towards the interior of the frame 1, such that he bottom surface of the edge 21 of the screen 2 is completely accommodated in the frame 1.

According to some embodiments of the present disclosure, as illustrated in FIG. 12, the accommodating part 310 may be further provided with an electromagnetic component 3102'. The first fitting part 312' is a permanent magnet, and the electromagnetic component 3102' drives the first fitting part 312' to reciprocate relative to the accommodating part 310' through a magnetic force. It should be noted that, the electromagnetic component 3102' may be an electromagnet or an electromagnetic coil, by providing the electromagnetic component 3102' and configuring the first fitting part 312' as the permanent magnet, an attraction force or a repulsive force can be generated between the electromagnetic component 3102' and the first fitting part 312' by controlling the direction of the current applied to electromagnetic component 3102', thereby, the first fitting part 312' can conveniently drive the second fitting part 314' and thus the screen 2 to switch between the first position and the second position, the structure is simple, and the operation is reliable.

In some embodiments, the first fitting part 312' and the second fitting part 314' are fitted with each other through an inclined surface. Thus, fitting surfaces of the first fitting part 312' and the second fitting part 314' can be conveniently machined, thereby improving the production efficiency and reducing the production cost.

Figure 13:
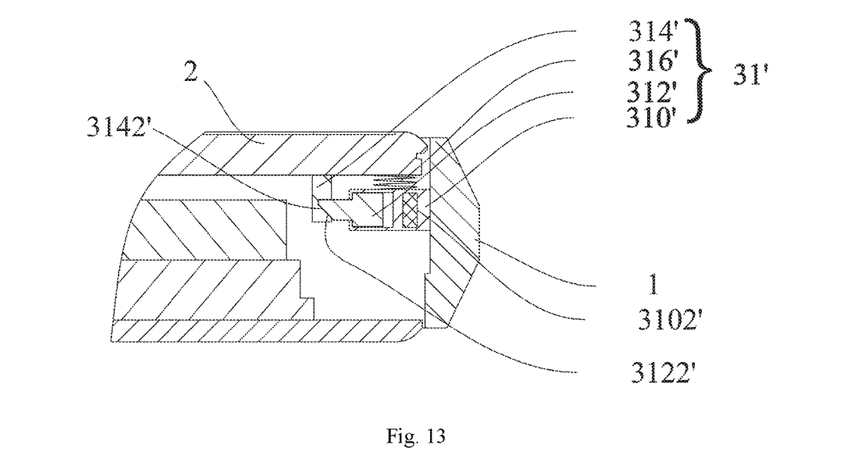
FIG. 13 is a partial detail view of the moving mechanism shown in FIG. 11, in which a screen is in a second position.

Further, as illustrated in FIGS. 12 and 13, the first fitting part 312' has a first inclined fitting surface 3122' at an end of the first fitting part 312' adjacent to the second fitting part 314', and the second fitting part 314' has a second inclined fitting surface 3142' at an end of the second fitting part 314' adjacent to the first fitting part 312' which matches with the first inclined fitting part 3122'. Thus, the movement of the second fitting part 314' driven by the first fitting part 312' can be facilitated through the fitting between the first fitting part 3122' and the second fitting part 3142'.

In some embodiments of the present disclosure, the driving unit 31' further includes a spring 316'. The spring 316' is provided between the screen 2 and the frame 1. For example, during normal use, the spring can be in a stretch state, the bottom surface of the edge 21 of the screen 2 can be flush with, or slightly lower than, or higher than the upper surface of the frame 1. Thus, the controller 4 is configured to apply a current to the electromagnetic component 3102' when the sensor 30 senses that the mobile terminal 100 drops, such that the repulsive force is generated between the electromagnetic component 3102' and the first fitting part 312', the first fitting part 312' moves away from the electromagnetic component 3102', engages with the second fitting part 314' and pushes the second fitting part 314' to move downwards, the screen 2 is driven to move from the first position to the second position, and the spring is compressed; and configured to apply a current in an opposite direction to the electromagnetic component 3102', such that the attraction force is generated between the electromagnetic component 3102' and the first fitting part 312', the first fitting part 312' moves towards the electromagnetic component 3102', disengages with the second fitting part 314', and the screen 2 restores from the second position to the first position under the elastic restoring force of the spring 316'.

Further, the timer can be provided in the mobile terminal 100, and the timer starts the timing when the mobile terminal 100 drops or after the drop of the mobile terminal 100. For example, it can be set that the controller drives the driving unit 31 to recover to the state in normal use after t seconds of time.

With the mobile terminal 100 according to embodiments of the present disclosure, during the drop of the mobile terminal 100, it is possible to protect the edge 21 of the screen 2 effectively and cushion the impact force suffered by the upper surface of the screen 2, which reduces the probability of the crash of the screen 2, improves the crash resistance and reliability of the screen 2 effectively, prolongs the service life of the mobile terminal 100, and decreases the use cost of the mobile terminal 100.

It should be noted that, the mobile terminal 100 may be various devices capable of acquiring data from the outside and processing the data, or the mobile terminal 100 may be various devices that have a built-in battery and are capable of obtaining current from the outside to charge the battery, such as a mobile phones, a tablet, a computing device or an information display device, and the like. The mobile phone is only an example of the mobile terminal 100, which is not specifically limited by the present disclosure.

Figure 14:
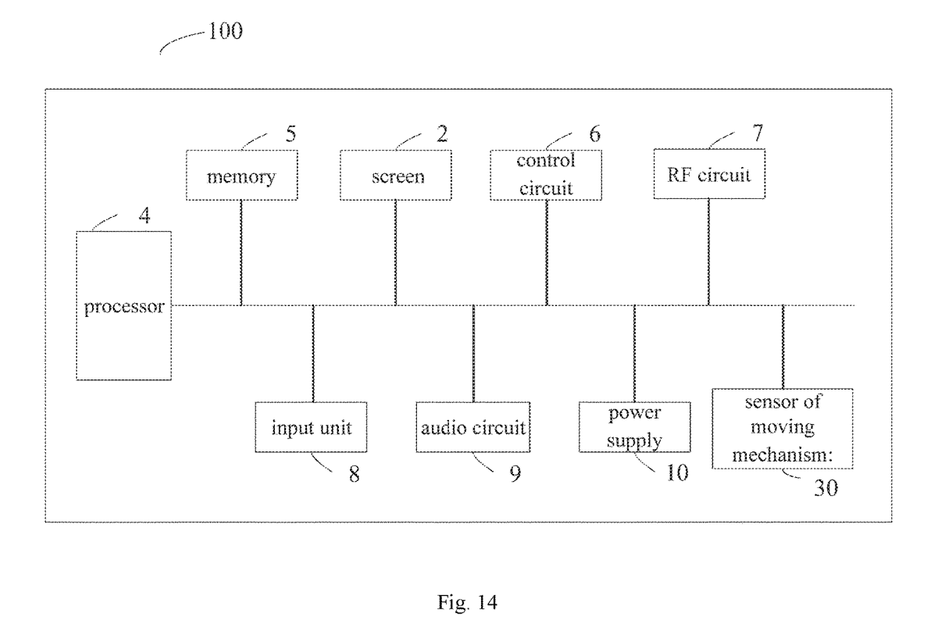
FIG. 14 is a schematic diagram of a mobile terminal according to an embodiment of the present disclosure.

In present disclosure, the mobile phone may include a controller 4, a memory 5, a screen 2, a control circuit 6, a radio frequency (RF) circuit 7, an input unit 8, an audio circuit 9 and a power supply 10. The controller 4 is electrically coupled to the RF circuit 7, the input circuit 8, the audio circuit 9, and the power supply 10.

The controller 4 is a control center of the mobile terminal 100, which can be coupled to respective components of the mobile terminal 100 via various interfaces and wires, and can perform various functions and processing data of the mobile terminal by running software programs stored in the memory 5 and invoking data stored in the memory 5.

The memory 5 may be configured to store applications and data. The applications stored in comprise instructions executable by the controller. The applications can compose various functional modules. The controller 4 performs various functional applications and data processing by running the applications stored in the memory 5.

The screen 2 may be configured to display information inputted by the user, information provided to the user and various graphic user interfaces of the terminal. These graphic user interfaces may constitute images, text, icons, videos or any combination thereof.

The control circuit 6 is electrically coupled to the screen 2, configured to control the screen 2 to display information.

The RF circuit 7 may be configured to receive and send RF signals to establish wireless communication between network devices or other mobile terminals via wireless communication mode. The RF circuit 7 may be configured to receive and send signals with the network devices and other mobile terminals.

The input unit 8 may be configured to receive input digital or character information, or user characteristic information (such as fingerprint) to generate keypad input, mouse input, joystick input, optical or trackball input related to the user setting and functional control. The input unit 8 may include a fingerprint identification component.

The audio circuit 9 may provide audio interfaces between the user and the terminal through a loudspeaker, and a microphone.

The power supply 10 is configured for supplying power to the components of the mobile terminal 100. In some embodiments, the power supply 10 may be logically coupled with the controller 4 by using a power management system, thereby implementing functions such as charging, discharging and power consumption management by using the power management system.

Reference throughout this specification to "an embodiment," "some embodiments," "an exemplary embodiment," "an example," "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples.

Although embodiments have been illustrated and described, it would be appreciated by those skilled in the art that changes, modifications, alternatives and variants can be made in the embodiments without departing from principles and purposes of the present disclosure. The protection scope of the present disclosure is defined by the claims or their equivalents.

What is claimed is:

1. A screen assembly, comprising:
   a frame;
   a screen, the screen being disposed at an inner side of the frame, and the screen being movable between a first position and a second position along a thickness direction of the screen with respect to the frame, the screen being configured to move towards an interior of the frame from the first position to the second position in a drop process of the screen assembly; and
   a moving mechanism disposed in the frame,
   wherein the screen comprises an edge and a bottom surface where a bottom of the edge is located, when the screen is located in the first position, the bottom surface of the screen is flush with an upper surface of the frame,
   wherein the moving mechanism comprises a first magnet and a second magnet, the first magnet is fixedly provided to a lower side of the screen, the second magnet is fixedly provided to the frame, and the second magnet is configured to cooperate with the first magnet to drive the screen to move from the first position to the second position.

2. The screen assembly according to claim 1, wherein the bottom surface of the screen is at least partially accommodated in the frame when the screen is located in the second position.

3. The screen assembly according to claim 1, wherein the bottom surface of the screen is completely accommodated in the frame when the screen is located in the second position.

4. The screen assembly according to claim 1, wherein when the screen is located in the second position, a distance between the bottom surface of the screen and an upper surface of the frame is L1, and L1 satisfies: 0.01 mm<L1<1 mm.

5. A mobile terminal, comprising:
   a frame;
   a screen comprising an edge and a bottom surface where a bottom of the edge is located, the screen being disposed at an inner side of the frame, and the screen being movable between a first position, where the bottom surface of the screen is flush with an upper surface of the frame, and a second position, where the bottom surface of the screen is at least partially accommodated in the frame, along a thickness direction of the screen with respect to the frame;
   a controller; and
   a moving mechanism disposed in the frame and comprising a sensor and a driving unit,
   wherein the sensor is connected with the controller, and the driving unit is connected to the controller and the screen separately so as to drive the screen to move from the first position to the second position,
   wherein the moving mechanism comprises a first magnet and a second magnet, the first magnet is fixedly provided to a lower side of the screen, the second magnet is fixedly provided to the frame, and the second magnet is configured to cooperate with the first magnet to drive the screen to move from the first position to the second position.

6. The mobile terminal according to claim 5, wherein the second magnet defines a mounting hole, the frame is provided with a mounting post, and the mounting post is fitted with the mounting hole to secure the second magnet to the frame.

7. The mobile terminal according to claim 5, wherein the first magnet is a permanent magnet, the second magnet is an electromagnet, and the controller is configured to apply a current to the second when the sensor senses that the mobile terminal drops, such that the attraction force is generated between the first magnet and the second magnet, and the screen is driven to move from the first position to the second position.

8. The mobile terminal according to claim 7, wherein the controller is configured to apply a current in an opposite direction to second magnet when the sensor senses that the mobile terminal is stationary, such that a repulsive force is generated between the first magnet and the second magnet, and the screen is driven to restore from the second position to the first position.

9. The mobile terminal according to claim 7, wherein the driving unit further comprises a spring provided between the screen and the frame, the spring is compressed when the screen is in the second position; and the controller is configured to deenergize the second magnet when the sensor senses that the mobile terminal is stationary, such that the screen restores from the second position to the first position under an elastic restoring force of the spring.

10. A mobile terminal, comprising:
    a rim;
    a screen, the screen being disposed at an inner side of the rim, and the screen being movable between a first position and a second position along a thickness direction of the screen with respect to the rim, the screen being configured to move towards an interior of the rim from the first position to the second position in a drop process of the mobile terminal;
a controller; and
a moving mechanism, the moving mechanism being disposed in the rim, the moving mechanism being configured to drive the screen to move from the first position to the second position during the drop of the mobile terminal,
wherein the screen comprises a periphery and a bottom surface where a bottom of the periphery is located, when the screen is located in the first position, the bottom surface of the screen is flush with an upper surface of the rim,
wherein the moving mechanism comprises:
  a sensor, the sensor being connected to the controller of the mobile terminal; and
  a driving unit, the driving unit being connected to the controller and the screen separately so as to drive the screen to move from the first position to the second position during the drop of the mobile terminal,
wherein the driving unit comprises an accommodating part, a first fitting part and a second fitting part, the accommodating part is fixedly coupled to the frame, the first fitting part is movably provided in the accommodating part, and the second fitting part is fixedly coupled to the lower side of the screen, and the first fitting part may be fitted with the second fitting part to push the second fitting part and the screen to move from the first position to the second position.

11. The mobile terminal according to claim 10, wherein the bottom surface of the screen is at least partially accommodated in the rim when the screen is located in the second position.

12. The mobile terminal according to claim 10, wherein the bottom surface of the screen is completely accommodated in the rim when the screen is located in the second position.

* * * * *